US011403269B2

(12) United States Patent
Cheru et al.

(10) Patent No.: US 11,403,269 B2
(45) Date of Patent: Aug. 2, 2022

(54) VERSIONING VALIDATION FOR DATA TRANSFER BETWEEN HETEROGENEOUS DATA STORES

(71) Applicant: Western Digital Technologies, Inc., San Jose, CA (US)

(72) Inventors: Tomy Ammuthan Cheru, Thrissur (IN); Vibhor Arunkumar Patale, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 291 days.

(21) Appl. No.: 16/361,493

(22) Filed: Mar. 22, 2019

(65) Prior Publication Data
US 2019/0370237 A1 Dec. 5, 2019

(30) Foreign Application Priority Data
Jun. 2, 2018 (IN) .............................. 201811020720

(51) Int. Cl.
*G06F 16/2458* (2019.01)
*G06F 16/215* (2019.01)
*G06F 16/2457* (2019.01)
*G06F 16/21* (2019.01)
*G06F 9/54* (2006.01)
(Continued)

(52) U.S. Cl.
CPC ............ *G06F 16/219* (2019.01); *G06F 9/542* (2013.01); *G06F 16/215* (2019.01); *G06F 16/2336* (2019.01); *G06F 16/2474* (2019.01); *G06F 16/24573* (2019.01); *G06F 16/289* (2019.01)

(58) Field of Classification Search
CPC ...... G06F 16/1873; G06F 16/219; G06F 8/71; G06F 16/2336; G06F 16/24573; G06F 16/2474; G06F 9/542; G06F 16/289; G06F 16/215
See application file for complete search history.

(56) References Cited

U.S. PATENT DOCUMENTS

| 5,649,200 A | 7/1997 | Leblang et al. |
| 5,729,744 A * | 3/1998 | Gerken ..................... G06F 8/71 |
| 5,813,009 A | 9/1998 | Johnson et al. |

(Continued)

FOREIGN PATENT DOCUMENTS

WO 2017023709 A1 2/2017

OTHER PUBLICATIONS

International Search Report and Written Opinion of Application No. PCT/US2019/023745, dated Jul. 2, 2019, p. 1-12.
(Continued)

*Primary Examiner* — Cheyne D Ly
(74) *Attorney, Agent, or Firm* — Patent Law Works LLP

(57) ABSTRACT

Example distributed storage systems, replication managers, and methods provide versioning validation for data transfers between heterogeneous data stores. A first object data store includes a versioned data object with a plurality of sequential versions corresponding to the versioned data object. A versioned write request message is sent to a second object data store and a response is received. The versioning-enabled status of the second object data store is determined from the response message and, if the versioning enabled status is invalid, any residual object versions in the second object data store are deleted based on a delete request.

20 Claims, 9 Drawing Sheets

(51) Int. Cl.
*G06F 16/28* (2019.01)
*G06F 16/23* (2019.01)

(56) References Cited

U.S. PATENT DOCUMENTS

| | | | |
|---|---|---|---|
| 6,615,223 B1* | 9/2003 | Shih | G06F 16/27 |
| | | | 707/625 |
| 8,504,758 B1 | 8/2013 | McHugh et al. | |
| 8,533,170 B1* | 9/2013 | McHugh | G06F 16/1873 |
| | | | 707/695 |
| 8,650,156 B1 | 2/2014 | McHugh et al. | |
| 8,731,994 B2* | 5/2014 | Kass | G06Q 10/04 |
| | | | 705/7.31 |
| 2003/0145199 A1* | 7/2003 | Miller | H04L 67/42 |
| | | | 713/161 |
| 2005/0027757 A1 | 2/2005 | Kiessig et al. | |
| 2007/0208790 A1 | 9/2007 | Reuter et al. | |
| 2008/0005077 A1 | 1/2008 | Eggebraaten et al. | |
| 2008/0059608 A1* | 3/2008 | Wood | H04L 29/06027 |
| | | | 709/219 |
| 2010/0191774 A1 | 7/2010 | Mason, Jr. et al. | |
| 2012/0109915 A1* | 5/2012 | Kamekawa | G06F 16/93 |
| | | | 707/695 |
| 2013/0275379 A1 | 10/2013 | Trebas et al. | |
| 2014/0143208 A1 | 5/2014 | Kohl et al. | |
| 2014/0149353 A1 | 5/2014 | Lee et al. | |
| 2014/0244708 A1 | 8/2014 | Taine et al. | |
| 2015/0363271 A1 | 12/2015 | Haustein et al. | |
| 2016/0092526 A1 | 3/2016 | Kothari et al. | |
| 2016/0140133 A1 | 5/2016 | Lu et al. | |
| 2016/0330299 A1 | 11/2016 | Hu | |
| 2017/0032006 A1* | 2/2017 | Anglin | G06F 3/0604 |
| 2017/0359400 A1 | 12/2017 | Demulder et al. | |
| 2018/0019867 A1 | 1/2018 | Davis | |

OTHER PUBLICATIONS

International Search Report and Written Opinion of Application No. PCT/US2019/023751, dated Jul. 2, 2019, p. 1-12.

* cited by examiner

VERSIONING VALIDATION FOR DATA TRANSFER BETWEEN HETEROGENEOUS DATA STORES

TECHNICAL FIELD

The present disclosure generally relates to data storage, and in a more particular example, to version control for data transfer between heterogeneous data stores.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may include a variety of storage systems in varying locations and of varying ages and configurations. As a result, not all object data stores within a large-scale storage system may be configured to manage data objects and their related metadata in the same way. Such disparate configurations within the same storage system may be referred to as heterogeneous data stores. Within or between object storage systems, individual buckets may also be configured differently and described as heterogeneous.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels. In some cases, redundancy may include moving data objects between object data stores, such as using one or more replication agents, for mirroring, load balancing, and/or disaster recovery.

Version control among heterogeneous data stores may present a challenge. For example, when a versioned object is transferred to an object data store or bucket that does not have versioning enabled, version information may be lost. Also, because many replication agents use parallel and/or asynchronous replication paths, it is possible for versions of the same versioned object to be transferred at different times. In dynamic storage environments, it may be possible for the configuration of a destination data store to change during the transfer of object versions. This could result in incomplete versioned data objects being stored in the destination object store, if versioning is disabled or suspended during the transfer.

In addition, data objects can be large and use substantial computing and network resources to transfer between storage systems. Initiating a large data object transfer, which may include multi-part data object transfers, that may ultimately be invalidated because the destination object store did not have versioning enabled, may result in wasted resources that add to system overhead and latency.

As large-scale storage systems scale and create more heterogeneous object data stores within storage systems, reliable and efficient implementations for managing version control may be needed. A need exists for at least versioning validation for data transfer between heterogeneous data stores.

SUMMARY

Various aspects for versioning validation, particularly, versioning validation for data transfer between heterogeneous data stores are described.

One general aspect includes a system that includes a first object data store configured to include a first plurality of versioned data objects. A versioned data object of the first plurality of versioned data objects includes a plurality of sequential versions corresponding to the versioned data object. A second object data store is configured to include a versioning-enabled status. A replication manager includes at least one processor, where the replication manager is configured to: transfer the versioned data object from the first object data store to the second object data store; send a version write request message to the second object data store for the versioned data object; receive a response message from the second object data store; determine from the response message whether the versioning-enabled status is invalid; and send, responsive to determining the versioning-enabled status is invalid, a delete request for the versioned data object.

Implementations may include one or more of the following features. The replication manager may be further configured to add, responsive to determining the versioning-enabled status is invalid, a version write request for the versioned data object to a retry queue. The replication manager may be further configured to generate, responsive to determining the versioning-enabled status is invalid, a notification event configured to request enabling versioning on the second object data store. The second object data store may be configured to store, responsive to the version write request message, a residual version of the versioned data object in the second object data store when the versioning-enabled status is invalid and delete, responsive to the delete request, the residual version of the versioned data object. The version write request message may be a multi-part write request including multiple write transactions between the first object data store and the second object data store to transfer the versioned data object. The replication manager may be further configured to send a test message to the second object data store prior to initiating the version write request message for the multi-part write request. Initiating the version write request message may be responsive to determining the versioning-enabled status is valid. The test message may be a test version write request message that includes a host data size of 0. The replication manager may be further configured to retry, responsive to determining the versioning-enabled status is invalid, the test message a plurality of times. The replication manager may further include a versioning-invalid list of destination object data buckets with an invalid versioning-enabled status and may be further configured to add, responsive to determining the versioning-enabled status is invalid, a versioning-invalid entry for a destination object data bucket in the second object data store. The replication manager may be further configured to: search the versioning-invalid list for the destination object data bucket for the version write request message; send, responsive to finding the versioning-invalid entry for the destination object data bucket, a test version write request message to the destination object data bucket; and, responsive to receiving a test response message indicating the versioning-enabled status is valid, remove the versioning-invalid entry for the destination object data bucket; and initiate the version write request message.

One general aspect includes A computer-implemented method including: sending a version write request message for a versioned data object from a first object data store to a second object data store; receiving a response message from the second object data store; determining from the response message whether a versioning-enabled status is invalid; and sending, responsive to determining the versioning-enabled status is invalid, a delete request for the versioned data object. The versioned data object includes a plurality of sequential versions corresponding to the versioned data object and the second object data store includes the versioning-enabled status.

Implementations may include one or more of the following features. The computer-implemented method may further include adding, responsive to determining the versioning-enabled status is invalid, a version write request for the versioned data object to a retry queue. The computer-implemented method may further include generating, responsive to determining the versioning-enabled status is invalid, a notification event configured to request enabling versioning on the second object data store. The computer-implemented method may further include storing, responsive to the version write request message, a residual version of the versioned data object in the second object data store when the versioning-enabled status is invalid and deleting, responsive to the delete request, the residual version of the versioned data object. The computer-implemented method may further include sending a test message to the second object data store and receiving a test response message from the second object data store, where sending the version write request message is responsive to determining the versioning-enabled status is valid from the test response message. The computer-implemented method may further include retrying, responsive to determining the versioning-enabled status is invalid, the test message a plurality of times. The computer-implemented method may further include adding, responsive to determining the version enabled status is invalid, a versioning-invalid entry for a destination object data bucket in the second object data store to a versioning-invalid list. The computer-implemented method may further include: searching the versioning-invalid list for the destination object data bucket for the version write request message; sending, responsive to finding the versioning-invalid entry for the destination object data bucket, a test message to the destination object data bucket; and responsive to receiving a test response message indicating the versioning-enabled status is valid, removing the versioning-invalid entry for the destination object data bucket and initiating the version write request message.

One general aspect includes a system that includes a first object data store, including a first plurality of versioned data objects. A versioned data object includes a plurality of sequential versions corresponding to the versioned data object. A second object data store includes a versioning-enabled status. Means are provided for sending a version write request message for the versioned data object from the first object data store to the second object data store. Means are provided for determining, responsive to a response message from the second object data store, whether the versioning-enabled status is invalid. Means are provided for sending, responsive to determining the versioning-enabled status is invalid, a delete request for the versioned data object.

Implementations may include one or more of the following features. The system may further include: means for sending a test message to the second object data store and means for receiving a test response message from the second object data store, where sending the version write request message is responsive to determining the versioning-enabled status is valid from the test response message.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the version control for data transfer between heterogeneous data stores, such as by using versioning validation and automatic removal of residual objects when transferring versioned data objects between data stores. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
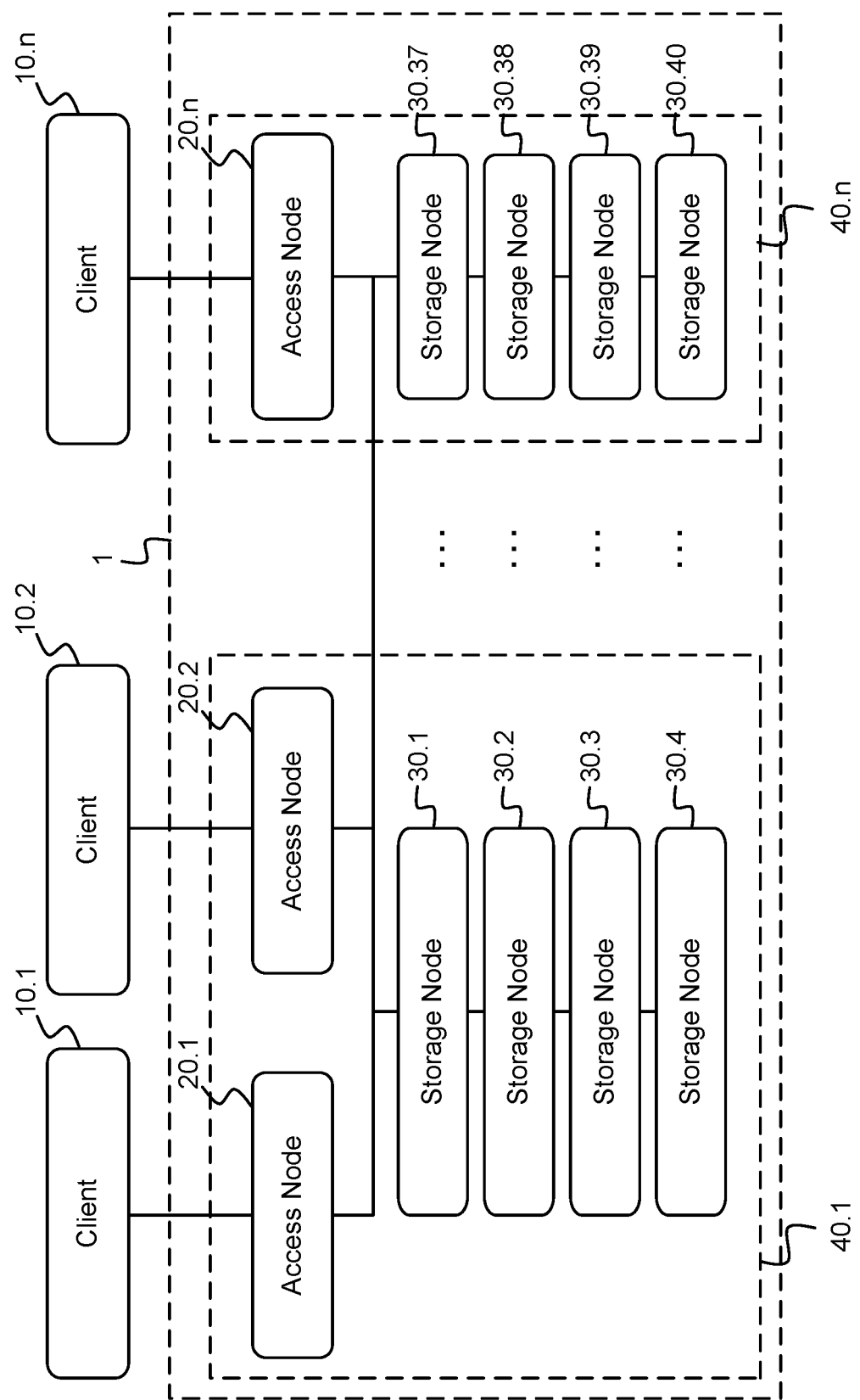
FIG. 1 schematically illustrates an example of a distributed storage system.

As discussed above, out of order versioned object write ingestion can occur in heterogeneous object storage systems between versioning enabled heterogeneous buckets.

Object storage systems have a notion of data objects. Data objects may be contained in buckets and each bucket may be associated with a specific object storage system or object data store. Specific object storage systems may include a number of configuration parameters, including support for versioning. In some systems, individual buckets may include different configuration parameters, including enabling and disabling version control within an object storage system that is otherwise configured for versioning.

In many object storage systems, a data object is written using either a PUT function, for single part objects, or a multi-part write process, such as INIT, multiple PARTPUT, and COMPLETE functions. Data objects written to a versioning not enabled or versioning suspended system or bucket, may create a data object with a version value set to null and a creation timestamp. Subsequent read functions, such as GET, of the data object with a defined object name (ex. "object1") may return the data object ("object1"). If an object is later written with the same object name ("object1"), the original object may be overwritten. Subsequent GET operations with the object name ("object1") may return the overwritten object and the original object may be lost.

However, in a versioning enabled system or bucket, earlier versions of the object may not get overwritten. A new write of an existing data object ("object1") may create a new version of that object. The object name does not change, but an additional version identifier may be associated with the new write. For example, when the object is initially written, it may receive a version identifier (ex. "1111"). Subsequent GET operations for the object name ("object1") return the object ("object1") with the most recent version identifier ("1111"). Each subsequent time an object with the same object name is written with versioning enabled, a new object is created with the same object name ("object1") but a new creation timestamp and a new version identifier (e.g. "2222", "3333". etc.). The set of data objects with the same object name and different version identifiers in a given storage system or bucket may be referred to collectively as a versioned data object, comprised of a plurality of data object versions. Ordering of versions may be important for GET operations that do not specify a version and are intended to retrieve the latest version of the object.

Data object creation time and versioning depends on specific implementations in different object storage systems, resulting in heterogeneous versioning configurations. Versioning may be different among different object storage systems, implementing entirely different versioning schemes that may not be recognized by other object storage systems. For example, the versioning identifiers may be in a format or location that is unknown to the other system. In such a case, a GET function from the other system intended to include a version request may not comply with the necessary operation syntax and may return an error, an empty object, or a default version, such as the most recent according to the local creation timestamp or versioning scheme.

In particular, a versioned write to a non-versioning-enabled bucket or data store may result in only a single, non-versioned data object being transferred and stored in the destination data store. As a result, all other object versions and associated metadata may be lost without generating any sort of system error or notice to system administrators. Even if an initial check of versioning-enabled status is made, it may not be an atomic operation with the actual versioned write and the status may be modified between the initial check and completion of the versioned data object transfer.

While validation of the versioning-enabled status of the destination bucket as part of the versioned write operation may be advantageous, there may still be a risk of transferring unnecessary data (using valuable compute and network resources) before receiving notice that the versioning-enabled status is invalid. This may be particularly wasteful for large data objects using multipart data transfers, where versioning status may not be confirmed until the last operation of the multipart sequence is complete. Additional safeguards to limit large, unnecessary data transfers may be implemented within versioning-enabled data write requests.

FIG. 1 shows an embodiment of an example distributed storage system 1. In some embodiments, the distributed storage system 1 may be implemented as a distributed object storage system which is coupled to one or more clients 10.1-10.*n* for accessing data objects through one or more access nodes 20.1-10.*n*. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.*n* comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
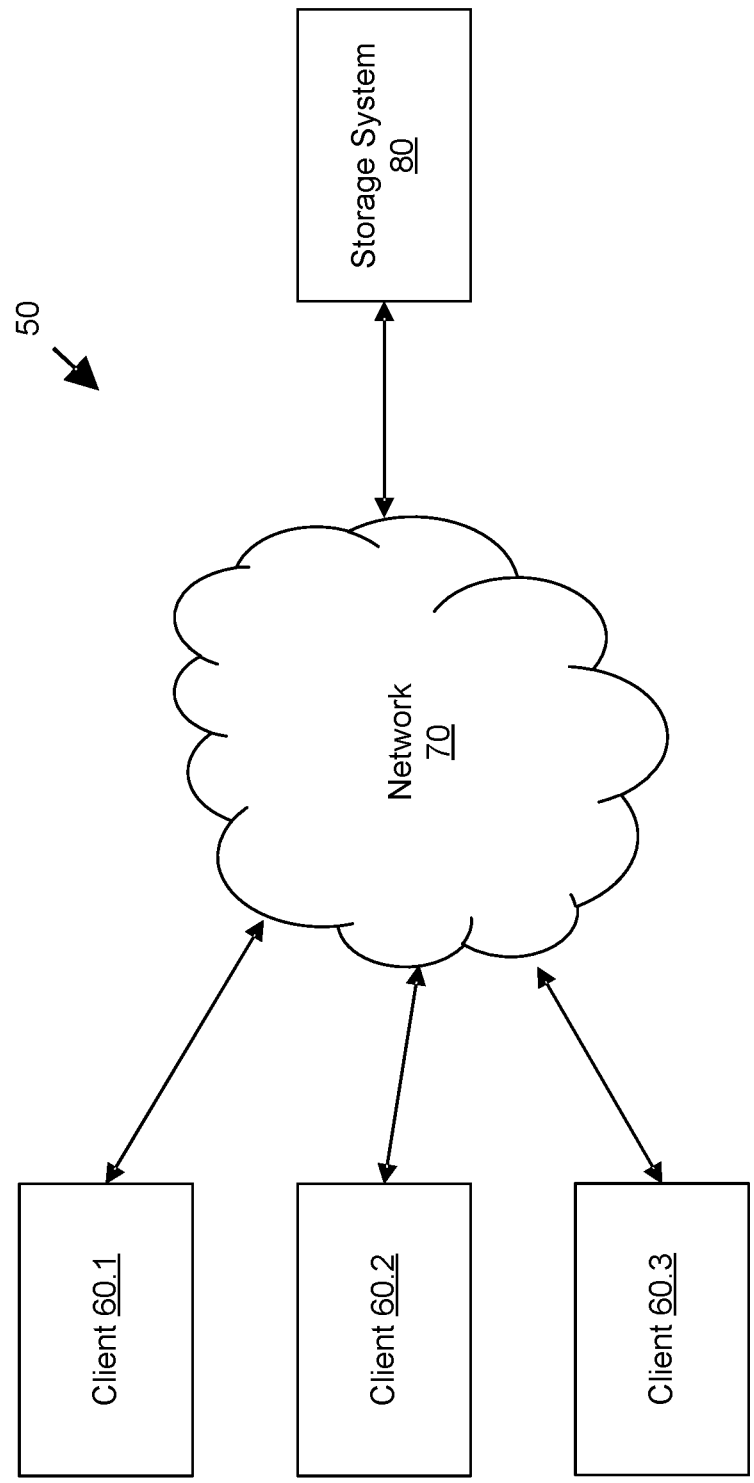
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
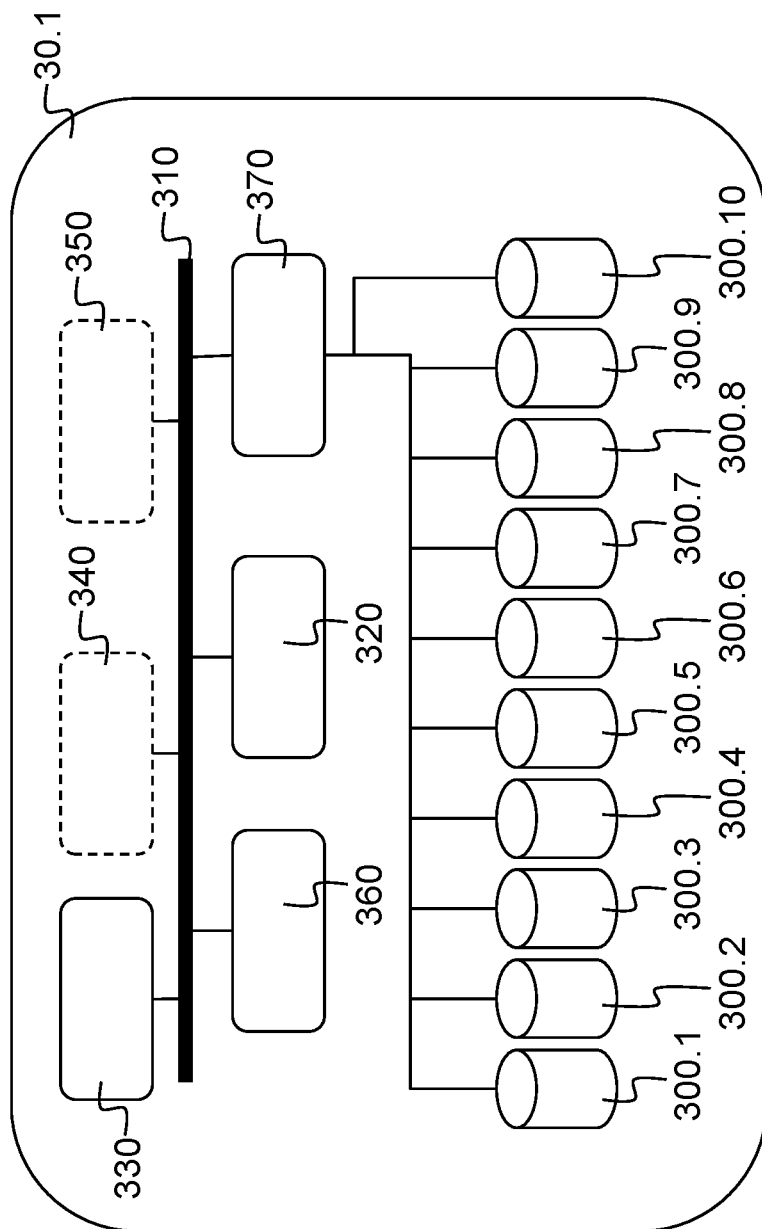
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
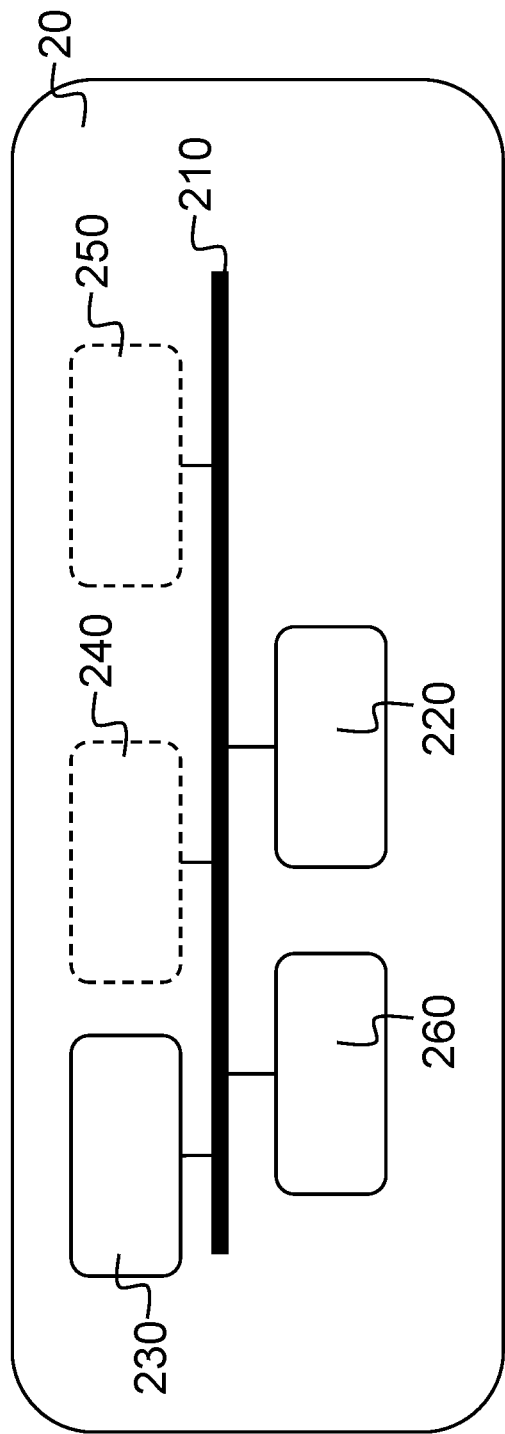
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
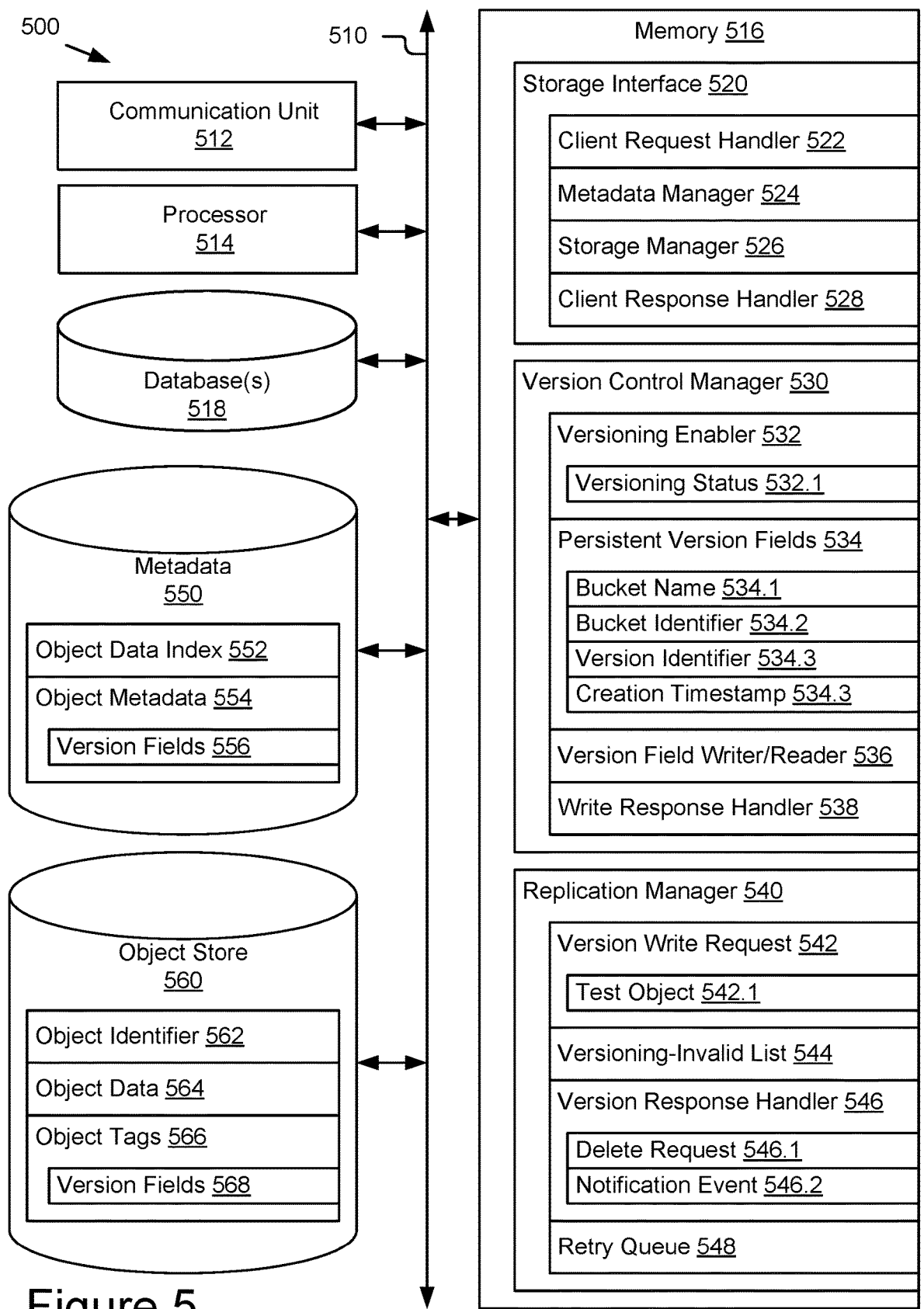
FIG. 5 schematically illustrates some example elements of an object storage system for the distributed storage system of FIG. 1.

FIG. 5 schematically shows selected modules of an access node or controller node with version control management, replication management, and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 550 and object store 560. Databases may include one or more data structures for storing, retrieving, indexing, searching, filtering, etc. of structured and/or unstructured data elements. In some embodiments, metadata store 550 may be structured as reference data entries and/or data fields indexed by metadata key value entries related to data objects stores in object store 560. Object store 560 may include data objects comprised of object data (such as host data), some amount of metadata (stored as metadata tags), and a GUID. Metadata store 550, object store 560, and/or other databases or data structures may be maintained and managed in separate computing systems, such as storage nodes, with separate communication, processor, memory, and other computing resources and accessed by access system 500 through data access protocols. Metadata store 550 and object store 560 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include a version control manager 530 for creating and managing object versions in object store 560. Memory 516 may include a replication manager 540 for processing data replication between storage nodes or storage systems, such as transferring or replicating data objects to other object stores that may be heterogeneous. In some embodiments, version control manager 530 and/or replication manager 540 may be integrated into storage interface 520 and/or managed as separate libraries or background processes (e.g. daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Storage interface 520 may include one or more object storage configurations that define a storage protocol used for validating, managing, and processing object data requests. For example, object storage configurations may generally define the availability of version control for any given object or bucket, as well as specifying how the object storage system creates and manages versioning information. Object storage configurations may also define what metadata is collected and stored, as well as whether it is stored in a metadata database, such as metadata store 550, in object metadata tags stored in the data objects, and/or a combination thereof.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 554 stored in metadata store 550. For example, when a new object is written to object store 560, at least one new metadata entry may be created in metadata store 550 to represent parameters describing or related to the newly created object. Metadata manager 524 may generate and maintain an object data index 552 that enables metadata manager 524 to locate object metadata within metadata store 550. For example, metadata store 550 may be organized as a key-value store and object data index 552 may include key values for data objects and/or operations related to those objects that are indexed with a key value that include the object identifier or GUID for each object. In some embodiments, metadata manager 524 may also manage object metadata stored in object store 560 with object data 564. Metadata manager 524 may work in conjunction with storage manager 526 to create, modify, delete, access or otherwise manage object metadata stored as object tags 566 within object store 560.

Storage manager 526 may include interfaces, functions, and/or parameters for reading, writing, and deleting object data elements in object store 560. For example, object PUT commands may be configured to write object identifier 562, object data 564, and/or object tags 566 to object store 560. Object GET commands may be configured to read data from object store 560. Object DELETE commands may be configured to delete data from object store 560, or at least mark a data object for deletion until a future garbage collection or similar operation actually deletes the data or reallocates the physical storage location to another purpose.

Other object storage commands may be handled by storage manager 526, including special functions defined for version control. Object storage commands processed by storage manager 526 may include parameters for accessing special functions and/or metadata resources stored with host or client data in the data objects. Storage manager 526 may work in conjunction with metadata manager 524 and version control manager 530 for managing object metadata, including versioning information. Storage manager 526 may work in conjunction with replication manager 540 to replicate or migrate data from object store 560 to another data store. For example, storage manager 526 may read the object store 560 for transfer by one or more replication engines managed by replication manager 540.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received In some embodiments, metadata store 550 may be distributed across multiple systems, such as a plurality of access systems. Metadata store 550 and/or portions thereof may be sharded data stores, wherein the data stores are partitioned into segments stored in different computing systems. Storage interface 520 may include the functions for locating and accessing relevant portions of the sharded data base.

Version control manager 530 may be invoked by storage interface 520 to manage version control for one or more data objects, buckets, or all of object store 560. For example, if versioning is enabled, each time the same object name is written, a new object version may be created. Similarly, which object version is returned from a read operation may be determined by a version identifier included as a parameter of the read operation and/or may default to the most recent version. Version control manager 530 may provide interfaces, functions, and parameters for managing the use of persistent version fields to version control across heterogeneous data stores. In some embodiments, version control manager 530 may be included within storage interface 520, such as within library functions used by client request handler 522, metadata manager 524, storage manager 526, and/or client response handler 528.

In some embodiments, version control manager 530 may include one or more hardware and/or software modules or data structures for executing specific operations. For example, version control manager 530 may include a versioning enabler 532, persistent version fields 534, version field writer/reader 536, and response handler 538.

Versioning enabler 532 may include one or more parameters, data structures, and/or related methods for manipulating those parameters or data structures. Versioning enabler 532 may be configured to manage versioning-enabled status 532.1 for object store 560 and/or specific buckets or data object contained therein. In some embodiments, each bucket may include a versioning-enabled field to determine whether versioning is enabled for that bucket. For example, versioning-enabled field may be a first value if versioning is enabled for a target data object, bucket, or object store and a second value if versioning is not enabled for the target data object, bucket, or object store. In some embodiments, versioning enabled fields may include more values to convey whether versioning is available (supported but not enabled), versioning is unsupported, or versioning is suspended (previously enabled but inoperative due to an interruption, conflict, or configuration choice at the bucket or object level).

In some contexts, versioning-enabled status 532.1 may be referred to as valid for a specific write transaction if versioned data objects may be written to object store 560 with their sequential object versions and related versioning metadata. There may be multiple values for versioning-enabled fields that translate into valid versioning-enabled status for a specific write transaction. Similarly, versioning-enabled status 532.1 may be referred to as invalid for a specific write transaction if versioned data objects may not be written to object store 560 with their sequential object versions and related versioning metadata. There may be multiple values for versioning-enabled fields that translate into invalid versioning-enabled status for a specific write transaction.

Versioning enabler 532 may also include one or more configurable parameters that define how versioning is handled by version control manager 530. For example, an object storage system may support both a default, local version control configuration and a persistent version control configuration for use across object storage systems. In some embodiments, versioning enabler 532 may include a parameter for determining whether version fields are stored in a metadata database, such as in object metadata 554 in metadata store 550, or with object data, such as in object tags 566 in object store 560.

Persistent version fields 534 may include one or more parameter, data structures, and/or related methods for configuring and generating persistent version fields for object versions. For example, a persistent version field configuration may include bucket name 534.1, bucket identifier 534.2, version identifier 534.3, and creation timestamp 534.3. In some embodiments, persistent version fields 534 may each include a series of values corresponding to the subfields and stored and presented according to a defined syntax. For example, an example persistent version field could be "bucket1.1234.1111.05/12/2018-01:00:00". In some embodiments, persistent version fields 534 may be originated when the object is initially created by a first object storage system and are transferred with the object versions whenever they are migrated or replicated. As a result, the original version information, including creation timestamp, may be determined from the object metadata, regardless of where that version of the object ends up or how many heterogeneous object stores it may have been transferred through (or when or in what order).

Version field writer/reader 536 may include functions, methods, or operations for providing the persistent version fields 556, 568 to be written to metadata and read from metadata. For example, for any given object version being created and stored to object store 560, version field writer may use persistent version fields 534 as a template to populate persistent version fields 556, 568 with corresponding values for the write operation, such as bucket name, bucket identifier, version identifier, and creation timestamp values related to the write operation. For any given read operation for a versioned data object or object version thereof, version field reader may identify the persistent version field from the metadata for each object version of interest and use persistent version fields 534 as a template to extract and return the corresponding values for the fields. In some embodiments, version field writer/reader 536 may be called by storage interface 520 and/or replication manager 540.

A special instance of version field writer/reader 536 may include a delete marker writer. For example, when a delete event is identified for a versioned data object, such as processing a delete command for the versioned data object that is received by storage interface 520, the delete marker writer may generate a data object version with no host data (or a host data size of 0) and a persistent version field that identifies the object version as a delete marker. This delete marker object version may have the same object name (like any other object version) and be managed and transferred like any other object version in for the versioned data object. In some embodiments, the delete marker may include a delete marker identifier, such as a flag, tag, or similar value, added to the persistent version field to identify the object version as a delete marker.

Write response handler 538 may include functions, methods, or operations for providing the responses to version write requests received from other object storage systems. For example, when a version write request is received by storage interface 520 to write a versioned data object into object store 560 from another object store, the version write request may be configured to receive a response regarding versioning status for the write request. Write response handler 538 may read versioning-enabled status 532.1 and determine whether the version write request was completed with a valid versioning-enabled status 532.1. In some embodiments, the valid/invalid status value determined by write response handler 538 may be appended to a write complete status message generated by storage interface 520.

Replication manager 540 may include functions, methods, or operations for managing the transfer of data objects, including versioned data objects, to other object stores or object storage systems. For example, replication manager 540 may manage one or more replication engines that move data objects from object store 560 to a destination object store that may be remote from object store 560. Replication manager 540 may be configured to transfer data objects between heterogeneous data stores. In some embodiments, replication manager 540 transfers each versioned data object, including object identifiers 562, object data 564, and associated object tags 566, which may include persistent version fields 568. In some embodiments, replication manager 540 may also transfer metadata associated with the data object from a corresponding metadata store, such as metadata store 550, using object data index 552 to identify associated object metadata 554, which may include persistent version fields 568.

In some embodiments, replication manager 540 may be configured for asynchronous data transfers. For example, a scheduler may select object for transfer based on criteria other than the order in which they were ordered within object store 560, such as object size, availability, etc. In some embodiments, multiple replication engines may operate in parallel and transfer object versions for the same versioned data object at similar times and using resources and paths that may result in different transfer rates. Thus, the object versions of versioned data objects may be ingested at the destination system in a different order than they were stored in object store 560 or even a different order than they were sent. Replication manager 540 may also support multipart data object transfers that include a plurality of write transactions to complete a single object replication. For example, a multipart write process may include a series of commands or messages, such as INIT, multiple PARTPUT, and COMPLETE functions.

In some embodiments, replication manager 540 may include one or more hardware and/or software modules or data structures for executing specific operations. For example, replication manager 540 may include a version write request 542, a versioning-invalid list 544, a version response handler 546, and retry queue 548.

Version write request 542 may a include a command, interface protocols, and/or a set of functions and parameters for a special write operation to provide validated writing of a versioned data object to another object store. For example, when replication manager is tasked with replicating a versioned data object to a heterogeneous data store with unknown versioning configuration, version write request 542 may enable the versioned data object to be transferred and written while validating that a valid versioning configuration was operational on the destination data store before confirming completion of the transfer to storage interface 520 or another system resource or client. In some embodiments, version write request 542 may operate as a PUT or multipart PUT command that awaits a response message that includes versioning related information for determining whether versioning status was valid for the PUT request. Version write request 542 may operate in conjunction with version response handler 546 to receive and validate the versioning status.

In some embodiments, version write request 542 may be configured to use a test object 542.1 to validate the versioning status of the destination object store. For example, version write request 542 may generate a test version write request or PUT request to the destination object store with the test object 542.1 rather than an object version or object part (for multipart PUTs). In some embodiments, test object 542.1 may include one or more object versions for the test object with no host data payload and a small object data size relative to the versioned data object being replicated. A test request for test object 542.1 may be executed prior to initiating the version write request for the versioned data object selected for replication. In some embodiments, a test request may be initiated in response to the destination object store or bucket having an entry in versioning-invalid list 544 and/or in response to determining an invalid versioning-enabled status from a response to a prior request to the same destination. Test objects 542.1 that are successfully written to the destination data store may still be followed with a delete request from version response handler 546 to remove test objects from the destination data store in a manner similar to the removal of residual data objects from failed versioned write requests.

Versioning-invalid list 544 may include a data structure maintained by replication manager 540 to improve the efficiency of initial version write requests and monitor versioning status during iterative test message and retry cycles. For example, versioning-invalid list 544 may include a searchable data structure with entries for destination object stores that have returned invalid versioning-enabled status. In some embodiments, bucket identifiers may be organized in a data table and used to index the bucket-invalid status for buckets in one or more destination object stores. Versioning-invalid list 544 may include a function or method to search the data structure for a bucket identifier of interest.

Version response handler 546 may a include a command, interface protocols, and/or a set of functions and parameters for receiving and parsing responses from the destination object store to validate writing of a versioned data object. For example, version response handler 546 may receive version write response messages that include parameters indicating the versioning-enabled status of the destination object store at the time of the version write request. In some embodiments, the version write response message may include a value for the versioning-enabled status. In some embodiments, version response handler 546 may include logic for parsing the parameters of the version write response message to determine the versioning-enabled status as valid or invalid.

A valid versioning-enabled status may trigger an operation complete or similar success message and/or enable continued processing of subsequent operations within replication manager 540, such as sending a delete request 546.1 for successful versioned writing of test object 542.1. An invalid versioning-enabled status may trigger delete request 546.1 to remove any residual object version(s) written to the destination object store but not completing the version write request. An invalid versioning-enabled status may trigger a notification event 546.2 back to the initiating service or client. In some embodiments, notification event 546.2 may indicate the invalid versioning-enabled status and/or request a versioning configuration change for the destination object store.

Retry queue 548 may include a data structure of maintaining a list of pending version write requests that may be retried through an iterative retry process. For example, an iterative retry process may be enabled for a fixed number of retries, retry period, or other limit on retry attempts, with or without the use of test messages to await a change in versioning-enabled status. In some embodiments, retry queue 548 may be maintained in a data structure, such as an operations table, with entries for each pending version write request and one or more parameters for determining priority, number of attempts, and other version write request data relevant to managing retry attempts.

In some embodiments, version write request 542, versioning-invalid list 544, version response handler 546, and/or retry queue 548 may provide one or more atomic functions for executing a valid versioned data object replication (or returning an appropriate error for a replication that could not be completed as described above). An atomic function may be invoked or requested by or through storage interface 520 and then maintain an operating state until the result or response is returned without further interaction with the initiating service. For example, version write request 542 may send the PUT request, version response handler 546 may receive the version write response and determine whether a delete request needs to be processed, and replication manager 540 may return a result, complete, or error message only once the delete request has been successfully executed. Similarly, if a version write request 542 is configured to use test requests or iterative attempts using retry queue 548, those operations may similarly be executed by replication manager until a resolution to the version write request is achieved without further input from the initiating service or client.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
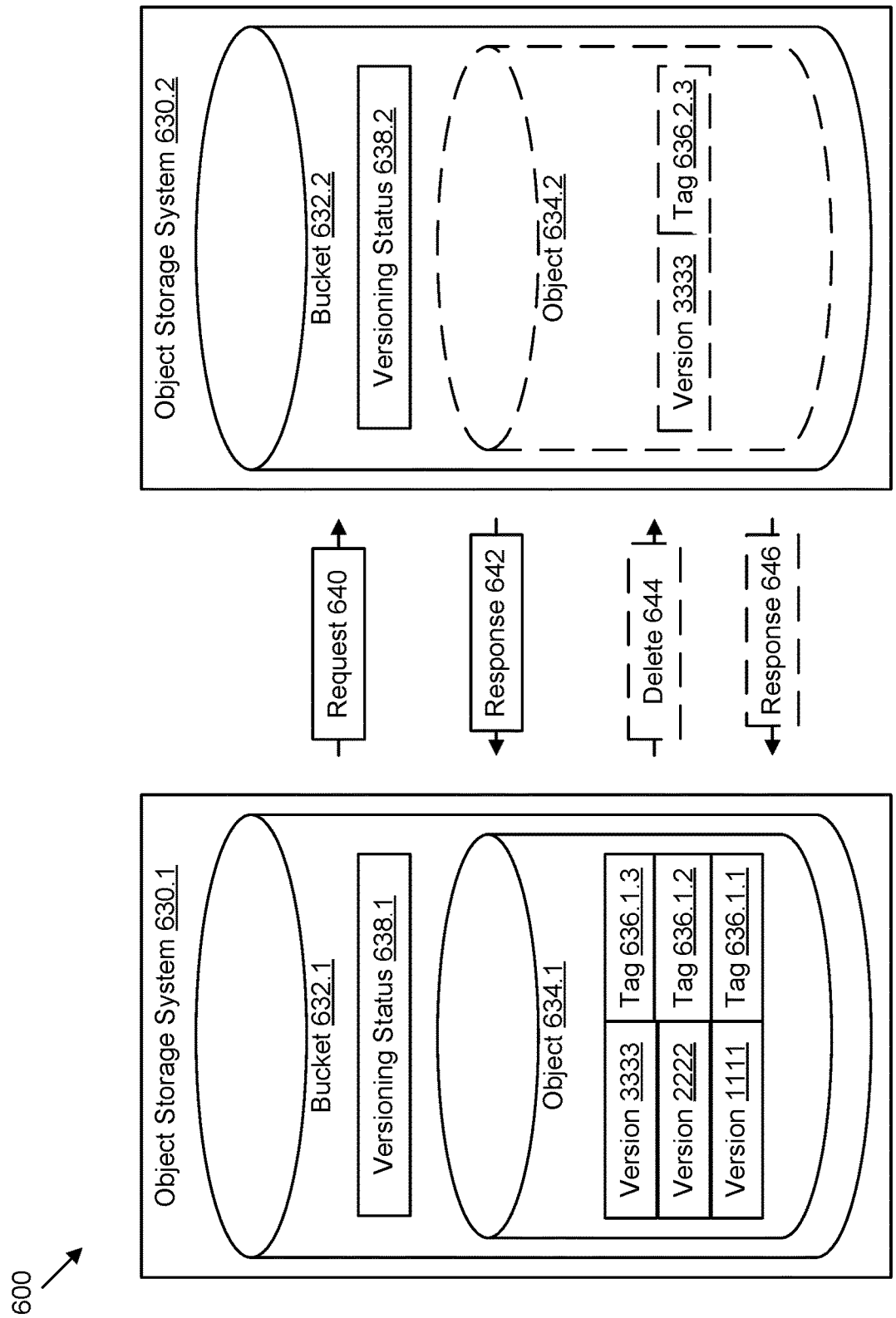
FIG. 6 schematically illustrates data objects transferred between example heterogeneous data stores with invalid versioning-enabled status.

FIG. 6 shows versioned data object 634 transferred between example heterogeneous data stores 600 in object storage systems 630.1 and 630.2. In some embodiments, heterogeneous data stores 600 may be configured according to the systems and elements described with regard to FIGS. 1-5. In the example shown, versioning status 638.1 is valid and versioning status 638.2 is invalid for the transfer between object storage systems 630.1 and 630.2. Versioned data object 634.1 is shown in bucket 632.1 in object storage systems 630.1 with object versions intact. Object 634.1 in bucket 632.1 may be the originating object store where object 634.1 and corresponding object versions 1111, 2222, 3333 where initially created in sequential order. Metadata tags 636.1.1, 636.1.2, and 636.1.3 may include persistent version fields containing the original version data, including version identifier and creation timestamp corresponding to the sequential versions of the data object.

Through an attempted version write request 640 from object storage system 630.1 to object storage system 630.2, the object versions were transferred to object storage system 630.2. Because versioning-enabled status 638.2 was invalid, such as versioning being disabled or unavailable for bucket 632.2, only version 3333 was successfully stored for object 634.2. This results in version 3333 being a residual data object for object 634.2, which may create errors if it remains in bucket 632.2. Response 642 may include versioning-enabled status 638.2 or other parameters from which versioning-enabled status 638.2 may be determined. As a result, when object storage system 630.1 receives and processes response 642, it may identify the error in writing versioned data object 634.2.

Object storage system 630.1 may identify the invalid version write attempt. In response, object storage system 630.1 may immediately and automatically issue a delete message 644 to delete version 3333 and object 634.2. It may await successful completion of the delete operation and response 646 from object storage system 630.2 before completing the failed replication attempt and providing appropriate notifications to the initiating services or clients. In an end state, object 634.2 and version 3333 may be removed from object storage system 630.2 and another attempt may be made after versioning status 638.2 has been updated without creating conflicts with the residual data object 634.2.

Figure 7:
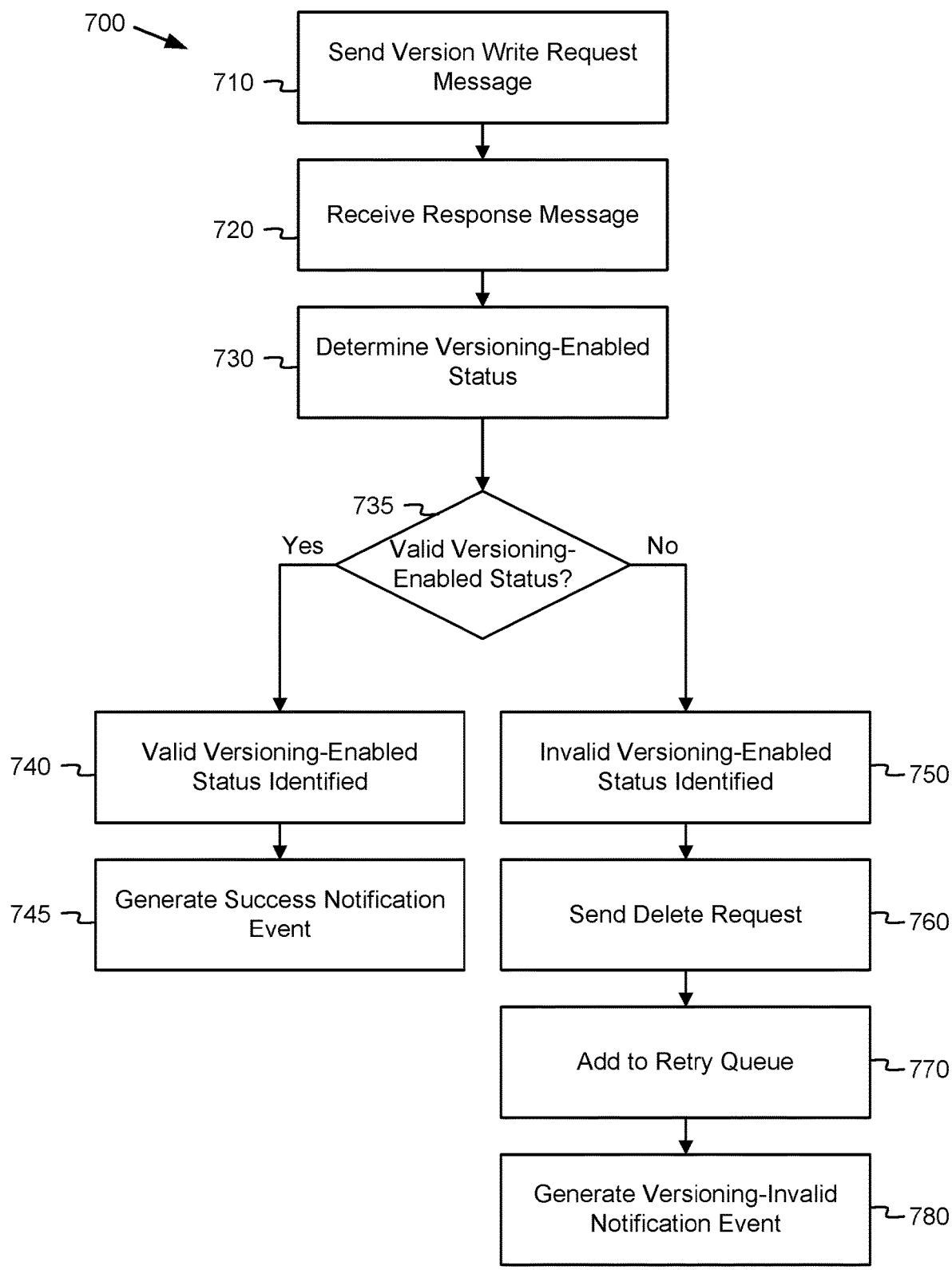
FIG. 7 illustrates an example method for validating versioning-enabled status.

As shown in FIG. 7, the object storage system 500 may be operated according to an example method for validating versioning-enabled status, i.e. according to the method 700 illustrated by the blocks 710-780 of FIG. 7.

At block 710, a version write request message may be sent to a destination object storage system including a destination object store. For example, a replication manager may generate a version write request for a versioned data object and send the version write request. In some embodiments, the version write request message may include a series of version write request messages for each of the object versions and/or parts of a multipart object write that involve multiple write transactions. The replication manager may then wait for a response.

At block 720, a response message may be received by the object storage system that sent the version write request. For example, the object storage system may receive a response message responsive to a PUT request sent as the version write request message.

At block 730, the versioning-enabled status for the destination object store may be determined from the response message. For example, the response message may include a flag or other parameter value for versioning-enabled status. In some embodiments, the replication manager may extract and parse one or more parameters in the response message to determine the versioning-enabled status. At block 735, whether or not the versioning-enabled status is valid may be determined? If yes, method 700 may proceed to block 740. If no, method 700 may proceed to block 750.

At block 740, valid versioning-enabled status has been determined for the version write request, for example, as described for block 730. At block 745, a success notification may be generated responsive to the valid versioning-enabled status. For example, a success notification may be sent to the initiating system service or client that the versioned data object was successfully replicated with versioning.

At block 750, invalid versioning-enabled status has been determined for the version write request, for example, as described for block 730. At block 760, a delete request for the versioned data object is sent to the destination object store. For example, a delete request to delete any residual object version(s) may be sent to the destination object store. At block 770, the version write request may optionally be added to a retry queue to be attempted again. At block 780, a versioning-invalid notification event may be generated. For example, a failure notification that includes an error code for versioning not enabled may be sent to the initiating system service or client. In some embodiments, the versioning-invalid notification event may generate a message to the destination object storage system or a related storage management system to enable versioning on the destination object store. For example, the object storage system may be configured to request that a versioning enabler on the destination object storage system change the versioning enabled status for the destination object data bucket.

Figure 8:
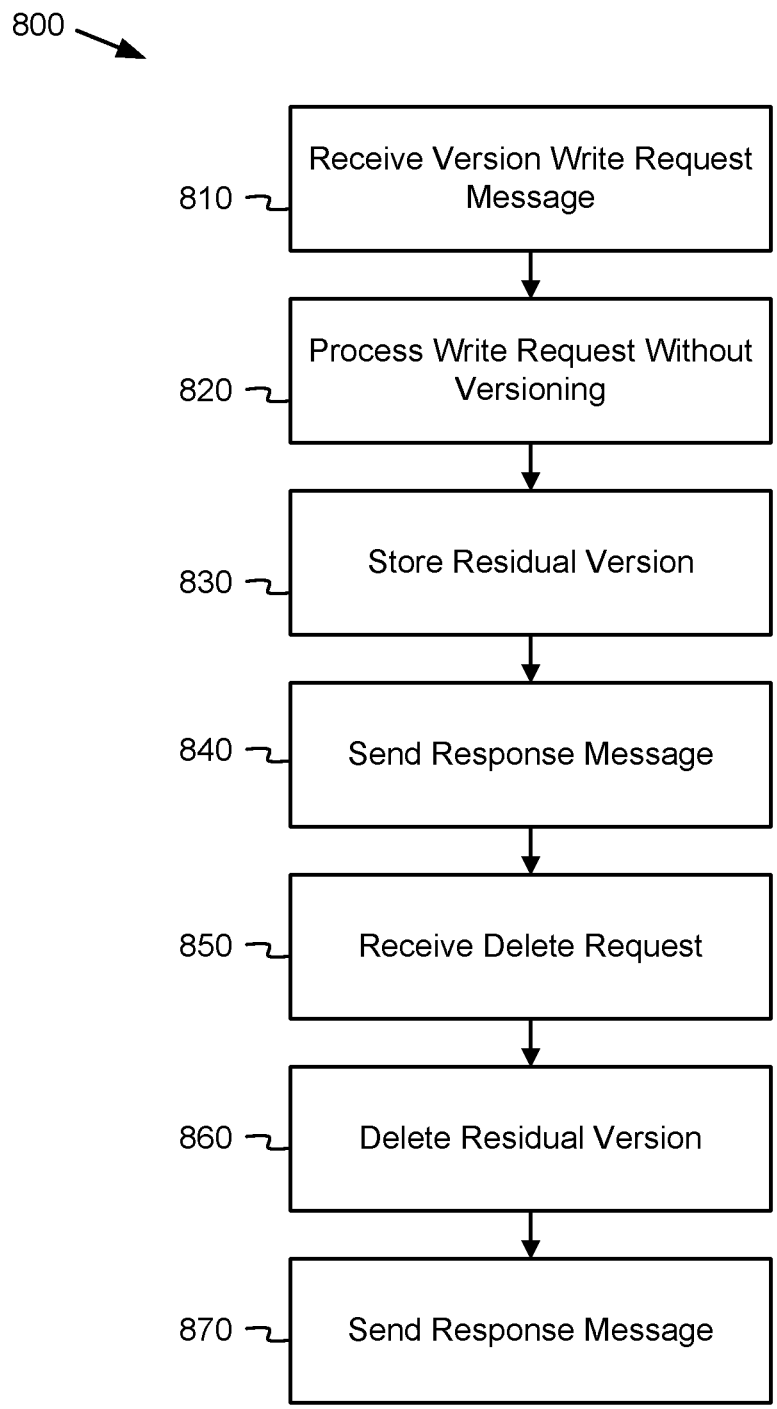
FIG. 8 illustrates an example method for responding to the example method of FIG. 7.

As shown in FIG. 8, the object storage system 500 may be operated according to an example method for responding to a version write request, i.e. according to the method 800 illustrated by the blocks 810-870 of FIG. 8. In some embodiments, method 800 may be responsive to the example method 700 of FIG. 7 as executed by the destination object storage system. In the example shown, versioning is not enabled for the destination object store and the versioning-enabled status is invalid.

At block 810, a version write request is received for a versioned data object. For example, the originating object storage system may send a version write request with one or more object versions for a versioned data object.

At block 820, the write request may be processed without versioning due to the versioning-enabled status being invalid. For example, each of the object versions received may overwrite the prior object version for the versioned data object.

At block 830, the residual version of the versioned data object is stored with that object name. For example, after each prior object version has been overwritten, only the last version may remain as the residual version and it will be stored on the object store using the object name and without regard to any versioning information provided in the request or the object itself.

At block 840, a response message is sent upon completion of the version write request. For example, completion of a write request may generate a completion message including parameters to match the completion message with the original request message. In some embodiments, the response message may include an indicator related to versioning-enabled status. In some embodiments, the response message may include parameters describing the residual data object stored without versioning information, from which the invalid versioning-enabled status may be determined.

At block 850, a delete request may be received for the residual object. For example, responsive to determining the invalid versioning-enabled status, the originating object storage system may send a delete request for the residual version(s).

At block 860, the residual version is deleted in response to the delete request. For example, the destination object storage system may process the delete request to delete the residual version.

At block 870, a response message is sent by the destination object storage system to confirm completion of the delete operation. For example, completion of a delete request may generate a completion message including parameters to match the completion message with the original request message.

Figure 9:
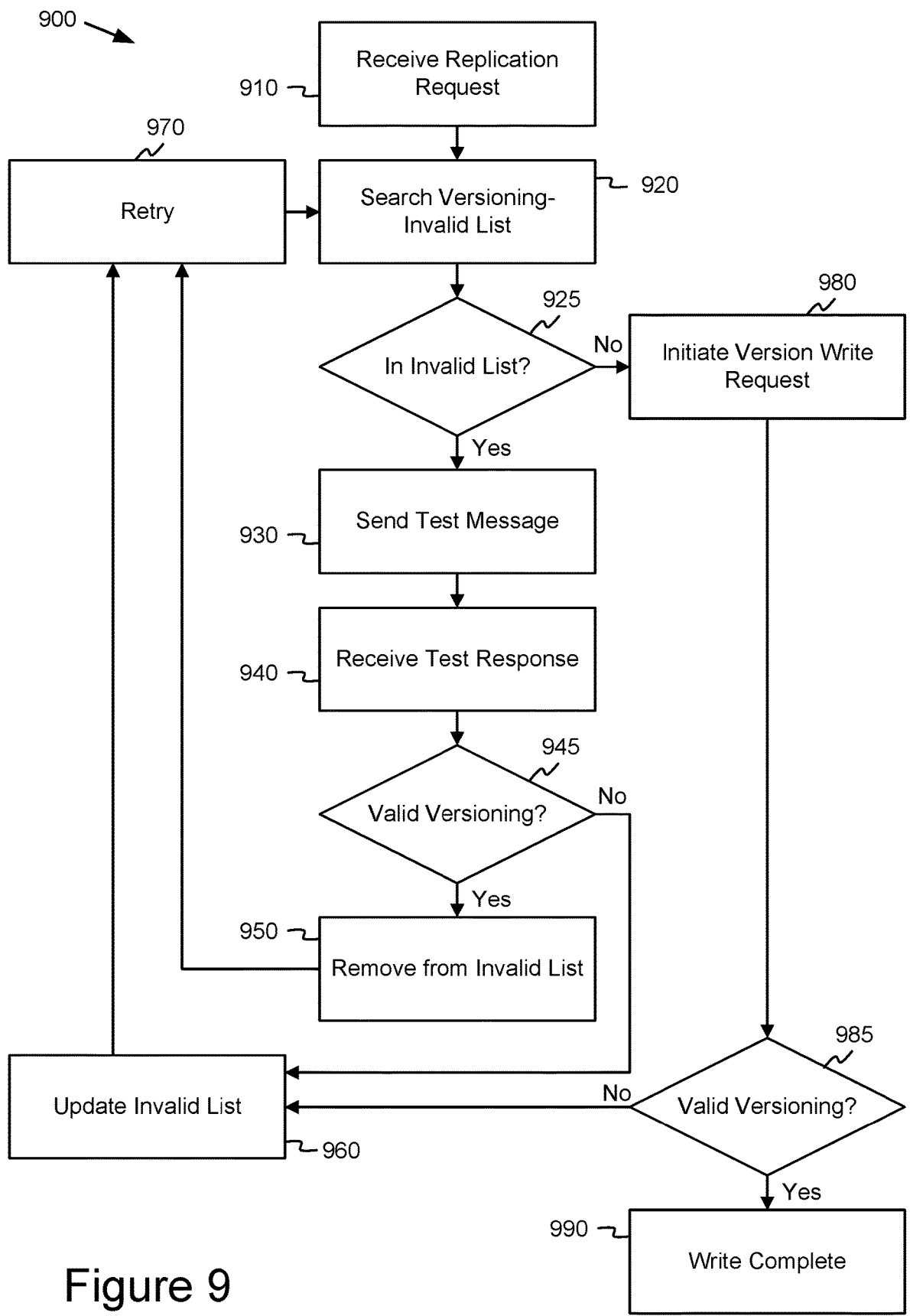
FIG. 9 illustrates an example method for validating versioning-enabled status using test messages.

As shown in FIG. 9, the object storage system 500 may be operated according to an example method for validating versioning-enabled status using test messages, i.e. according to the method 900 illustrated by the blocks 910-990 of FIG. 9.

At block 910, a replication request is received for a versioned data object. For example, a client or system service may initiate a replication operation for one or more data objects, buckets, or object stores in the originating data storage system.

At block 920, a versioning-invalid list is searched for the destination object store. For example, the replication request may include a destination bucket for the replication request and the bucket identifier may be used as an index to search a versioning-invalid list maintained by the originating storage system. At block 925, whether the destination bucket is in the versioning-invalid list may be determined. If yes, method 900 may proceed to block 930. If no, method 900 may proceed to block 980.

At block 930, a test request may be sent to the destination object store. For example, a test request that is a version write request for a versioned test object may be sent to the destination object storage system targeting the destination bucket. In some embodiments, a version status request message may be sent as a test message.

At block 940, a test response message to the test request may be received from the destination object storage system. For example, the version write request for the test object may generate a response message from which valid versioning-enabled status may be determined. Alternatively, a response message to a version status request may include versioning-enabled status information from which valid or invalid status may be determined. At block 945, whether the versioning-enabled status is valid may be determined. If yes, method 900 may proceed to block 950. If no, method 900 may proceed to block 960.

At block 950, the destination object store may be removed from the invalid list in response to the valid versioning test. For example, when the valid versioning-enabled status is determined from the response message, the originating object storage system may remove the entry for the destination bucket from the versioning-invalid list. Method 900 may proceed to block 970 to initiate a retry.

At block 960, the versioning-invalid list may be updated in response to invalid versioning. For example, if an entry already exists for the destination bucket, then that entry may be updated with the most recent attempt information or other related data. If no entry exists for the destination bucket, then a new entry for the destination bucket may be created.

At block 970, a retry iteration may be initiated. For example, whether a test iteration has passed or failed valid versioning or a version write request for the versioned data object being replicated has failed valid versioning, a retry may be initiated. In some embodiments, the retry may include a set of limit conditions that determine whether the retry proceeds back to block 920.

At block 980, a version write request for the versioned data object to be replicated is initiated. For example, the version write request may be processed as described above for method 700. At block 985, whether the versioning-enabled status is valid may be determined. If yes, method 900 may proceed to block 990. If no, method 900 may proceed to block 960. At block 990, the version write request for the versioned data object may be completed as described above with regard to method 700.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
    a processor;
    a memory;
    a first object data store comprising a first set of data storage devices configured to store a first plurality of versioned data objects, wherein a versioned data object of the first plurality of versioned data objects includes a plurality of sequential versions corresponding to the versioned data object;
    a second object data store comprising a second set of data storage devices configured to store a versioning-enabled status for data objects stored in the second object data store, wherein:
        the versioning-enabled status being valid indicates that versioning metadata for a transferred data object is stored in the second object data store; and
        the versioning-enabled status being invalid indicates that versioning metadata for the transferred data object is not stored in the second object data store; and
    a replication manager, stored in the memory for execution by the processor to:
        transfer the versioned data object from the first object data store to the second object data store;
        send a version write request message to the second object data store for the versioned data object;
        receive, from the second object data store, a response message including a versioning-enabled status parameter value;
        determine, from the versioning-enabled status parameter value in the response message, whether the versioning-enabled status is invalid; and
        send, responsive to determining that the versioning-enabled status is invalid, a delete request to the second object data store for the versioned data object.

2. The system of claim 1, wherein the replication manager is further executable to add, responsive to determining that the versioning-enabled status is invalid, a version write request for the versioned data object to a retry queue.

3. The system of claim 1, wherein the replication manager is further executable to generate, responsive to determining that the versioning-enabled status is invalid, a notification event configured to request enabling versioning on the second object data store.

4. The system of claim 1, wherein the second set of data storage devices comprising the second object data store is configured to:
  store, responsive to the version write request message, a residual version of the versioned data object in the second object data store responsive to the versioning-enabled status being invalid; and
  delete, responsive to the delete request, the residual version of the versioned data object.

5. The system of claim 1, wherein the version write request message is a multi-part write request including multiple write transactions between the first object data store and the second object data store to transfer the versioned data object.

6. The system of claim 5, wherein:
  the replication manager is further executable to send a test message to the second object data store prior to initiating the version write request message for the multi-part write request; and
  initiating the version write request message is performed responsive to determining that the versioning-enabled status is valid.

7. The system of claim 6, wherein the test message is a test version write request message that includes a host data size of 0.

8. The system of claim 6, wherein the replication manager is further executable to retry, responsive to determining that the versioning-enabled status is invalid, sending the test message a plurality of times.

9. The system of claim 1, wherein:
  the replication manager is further executable to store a versioning-invalid list of destination object data buckets with an invalid versioning-enabled status; and
  the replication manager is further executable to add, responsive to determining that the versioning-enabled status is invalid, a versioning-invalid entry for a destination object data bucket in the second object data store.

10. The system of claim 9, wherein the replication manager is further executable to:
  search the versioning-invalid list for the destination object data bucket for the version write request message;
  send, responsive to finding the versioning-invalid entry for the destination object data bucket, a test version write request message to the destination object data bucket; and
  responsive to receiving a test response message indicating that the versioning-enabled status is valid:
    remove the versioning-invalid entry for the destination object data bucket; and
    initiate sending the version write request message.

11. A computer-implemented method, comprising:
  sending a version write request message for a versioned data object from a first object data store to a second object data store, wherein:
    the versioned data object includes a plurality of sequential versions corresponding to the versioned data object;
    the second object data store includes a versioning-enabled status for data objects stored in the second object data store;
    the versioning-enabled status being valid indicates that versioning metadata for a transferred data object is stored in the second object data store; and
    the versioning-enabled status being invalid indicates that versioning metadata for the transferred data object is not stored in the second object data store;
  receiving, from the second object data store, a response message including a versioning-enabled status parameter value;
  determining, from the versioning-enabled status parameter value in the response message, whether the versioning-enabled status is invalid; and
  sending, responsive to determining that the versioning-enabled status is invalid, a delete request to the second object data store for the versioned data object.

12. The computer-implemented method of claim 11, further comprising:
  adding, responsive to determining that the versioning-enabled status is invalid, a version write request for the versioned data object to a retry queue.

13. The computer-implemented method of claim 11, further comprising:
  generating, responsive to determining that the versioning-enabled status is invalid, a notification event configured to request enabling versioning on the second object data store.

14. The computer-implemented method of claim 11, further comprising:
  storing, responsive to the version write request message, a residual version of the versioned data object in the second object data store responsive to the versioning-enabled status being invalid; and
  deleting, responsive to the delete request, the residual version of the versioned data object.

15. The computer-implemented method of claim 11, further comprising:
  sending a test message to the second object data store; and
  receiving a test response message from the second object data store, wherein sending the version write request message is performed responsive to determining that the versioning-enabled status is valid from the test response message.

16. The computer-implemented method of claim 15, further comprising:
  retrying, responsive to determining the versioning-enabled status is invalid, sending the test message a plurality of times.

17. The computer-implemented method of claim 11, further comprising:
  adding, responsive to determining that the version enabled status is invalid, a versioning-invalid entry for a destination object data bucket in the second object data store to a versioning-invalid list.

18. The computer-implemented method of claim 17, further comprising:
  searching the versioning-invalid list for the destination object data bucket for the version write request message;
  sending, responsive to finding the versioning-invalid entry for the destination object data bucket, a test message to the destination object data bucket; and
  responsive to receiving a test response message indicating that the versioning-enabled status is valid:
    removing the versioning-invalid entry for the destination object data bucket; and
    initiating sending the version write request message.

19. A system, comprising:
  a processor;
  a memory;
  a first object data store comprising a first set of data storage devices configured to store a first plurality of versioned data objects, wherein a versioned data object of the first plurality of versioned data objects includes a plurality of sequential versions corresponding to the versioned data object;

a second object data store comprising a second set of data storage devices configured to store a versioning-enabled status for data objects stored in the second object data store, wherein:

the versioning-enabled status being valid indicates that versioning metadata for a transferred data object is stored in the second object data store; and the versioning-enabled status being invalid indicates that versioning metadata for the transferred data object is not stored in the second object data store;

means, stored in the memory for execution by the processor, for sending a version write request message for the versioned data object from the first object data store to the second object data store;

means, stored in the memory for execution by the processor, for determining, responsive to a versioning-enabled status parameter value in a response message from the second object data store, whether the versioning-enabled status is invalid; and means, stored in the memory for execution by the processor, for sending, responsive to determining that the versioning-enabled status is invalid, a delete request to the second object data store for the versioned data object.

20. The system of claim 19, further comprising:

means, stored in the memory for execution by the processor, for sending a test message to the second object data store; and means, stored in the memory for execution by the processor, for receiving a test response message from the second object data store, wherein sending the version write request message is performed responsive to determining that the versioning-enabled status is valid from the test response message.

* * * * *